Patented May 16, 1944

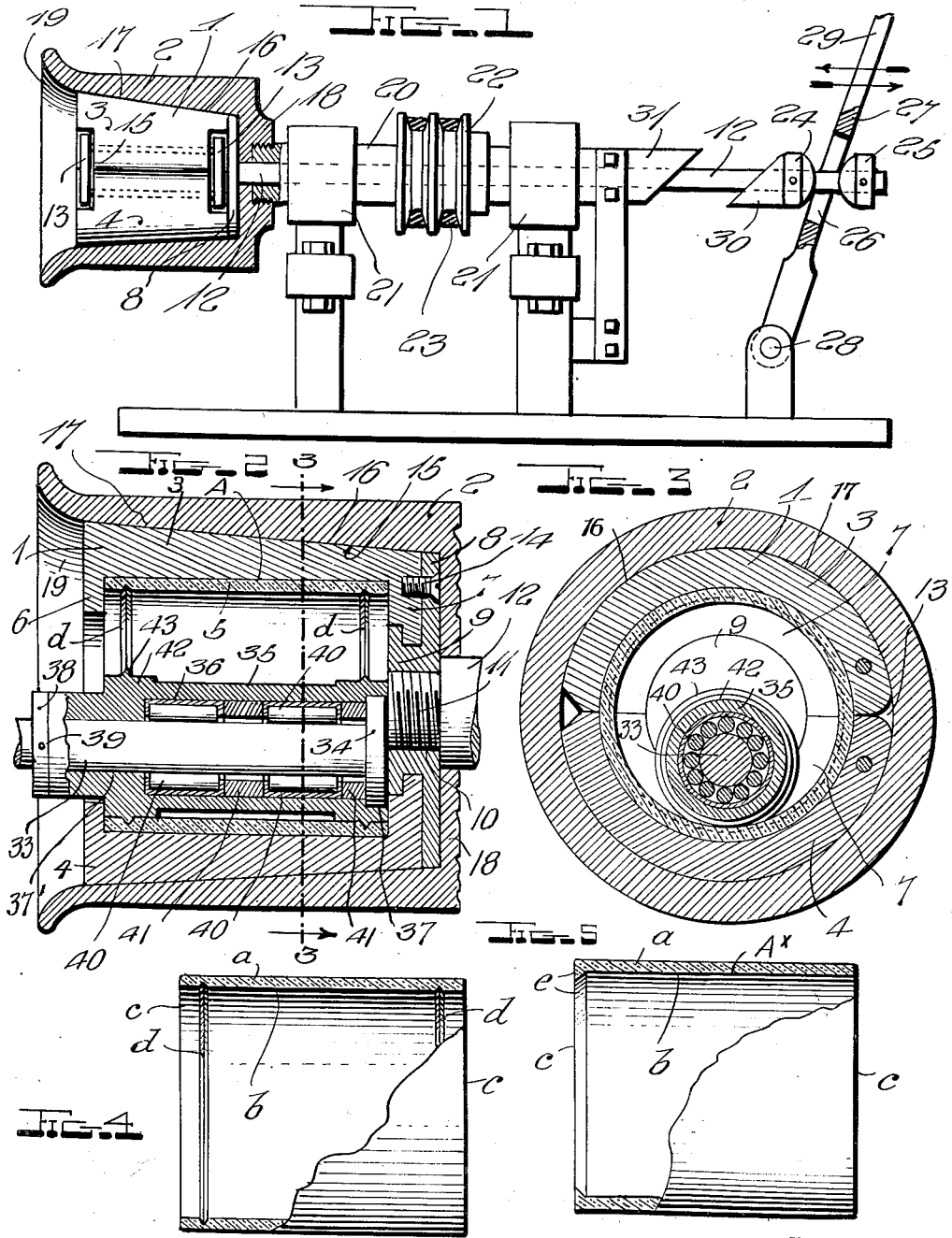

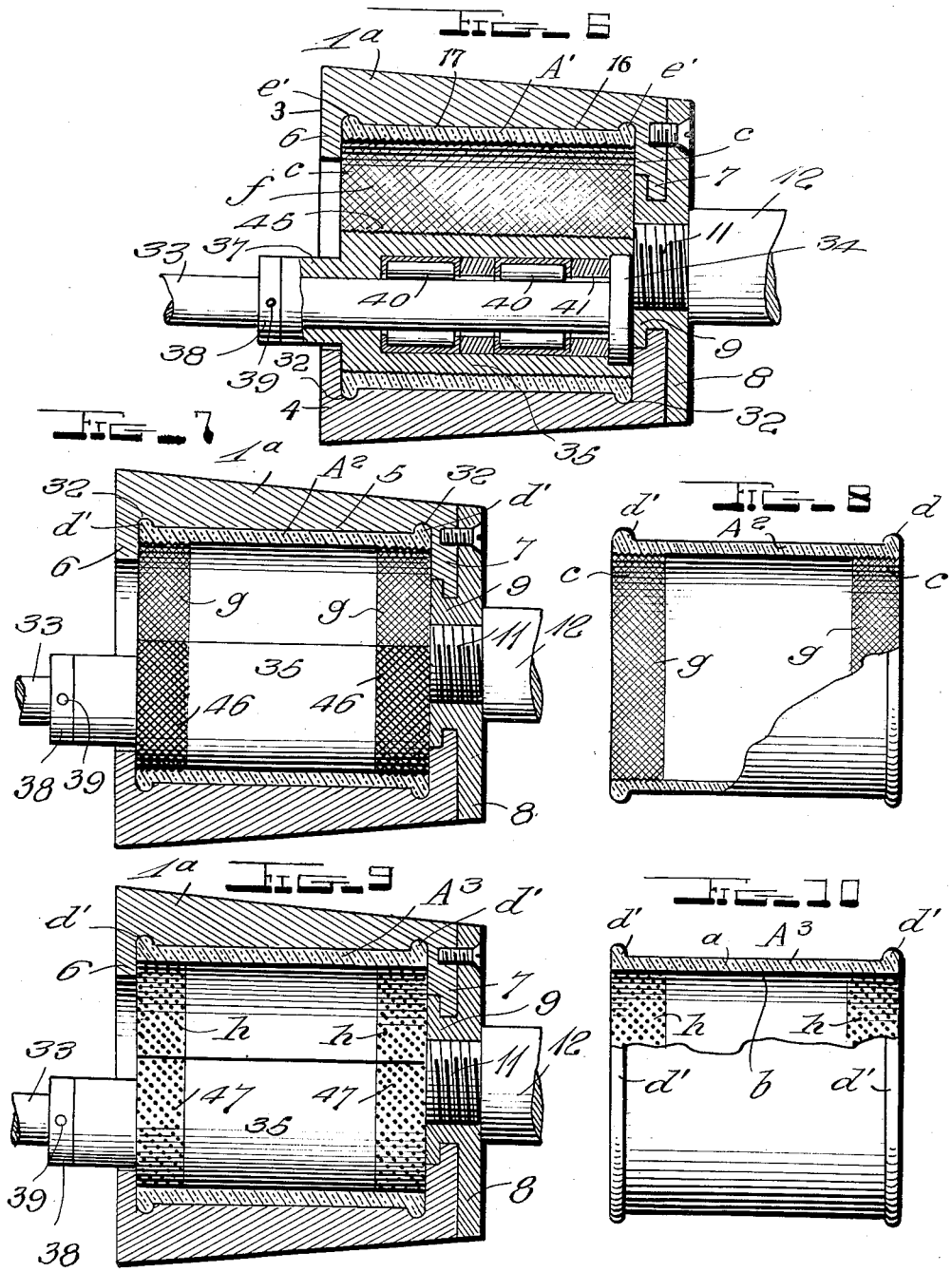

2,349,046

UNITED STATES PATENT OFFICE 2,349,046

METHOD OF AND APPARATUS FOR FORMING AND FINISHING HOLLOW GLASS BODIES

Paul R. Luertzing, Vineland, N. J., assignor of one-half to Walter O. Luertzing, Vineland, N. J.

Application October 24, 1940, Serial No. 362,648

6 Claims. (Cl. 49—29)

This invention relates to a method of and apparatus for manufacturing hollow glass articles and particularly glass articles or bodies of generally cylindrical or tubular form and of a type in which the article is open at each end, of a desired external configuration, and of substantially uniform internal diameter throughout and provided as a concomitant part of the forming process with finished ends. More particularly the invention, while designed and adapted for producing glass articles or bodies of this type for general uses, is directed to the production of cylindrical container bodies provided with finished ends constructed and adapted to have end heads or closures applied thereto and firmly secured in sealing engagement therewith.

In my applications for Letters Patents filed August 23, 1940, Serial Nos. 353,951 and 353,952, I have described and claimed a method of and apparatus for the centrifugal manufacture of a tube or cylinder having finished ends, and, as exemplified therein, for the manufacture of a cylindrical container body of the type referred to in which a container body open at each end, of uniform internal diameter throughout its length, of any desired external configuration, and having finished ends rendering the article suitable for any purpose for which it is designed, or for the application of sealing closures, may be produced by a single forming operation. In this exemplified type of article the finished ends of the container body produced are shown as formed by the apparatus disclosed with external beads for the sealing engagement of the heads or closures therewith and in which the sealing closures are accordingly engaged with retaining portions formed on the outer surface of the container body.

In the centrifugal manufacture of an article of this character it is found that under some conditions an annular fin, lip, or like internal annular projection is formed at one end or the other of the article. Although these fins when present on the manufactured articles may not interfere with the practical use of the articles, it is desirable to remove them. Generally the articles so produced are of fairly uniform internal diameter, but slight variances from a mathematically true internal diameter may occur rendering it necessary to further treat the article if it is desired to produce an article having a mathematically true internal diameter. In packing some kinds of goods or commodities it is desirable to have the locking and sealing connections between the ends of the container body and sealing heads located on the interior, instead of on the exterior, of the container body. It may also be desirable to give a desired shape, other than truly or substantially cylindrical, to the interior of the article, or to produce an article which is stippled, serrated, ribbed or otherwise surface impressed internally throughout its length or at one or more points in its length to give a frosted effect or other pleasing or aesthetic appearance to the article, or to make the article body translucent or opaque to conceal a certain portion of the contents of the body while allowing other portions to clearly appear, or to imprint in the body a trademark, design, emblem or other matter giving a desired ornamental appearance to the internal surface of the container which is displayed through the otherwise transparent wall thereof.

One object of the present invention is to provide a method of making a cylindrical or tubular article or container body of the character described and removing any formed excrescence or undesired projections or giving any desired finish, shape, configuration or appearance to the interior of the article.

Another object of the invention is to provide a method whereby seal engaging surfaces may be formed on either the interior or exteroir of the article and the interior of the article otherwise finished in any of the ways above described.

Still another object of the invention is to provide a method of finishing the interior surface of the article which may be performed at the completion of a centrifugal forming operation and while the article is still in the mold and in a sufficiently plastic state.

Still another object of the invention is to provide a method of and means for manufacturing a cylindrical glass article, open at each end, whereby the conformation of the inner surface may be accurately controlled as desired by forming means cooperating cooperatively with the mold or means which forms and shapes the external surface and end portions of the article by centrifugal force.

Still another object of the invention is to provide a method of and apparatus for manufacturing a hollow cylindrical glass article whereby any portion or all of the internal surface may be stippled or impressed with a design or given any desired configuration.

Still another object of the invention is to provide a method and appartus whereby the internal surface of the article can be formed with annular recesses so that paper, metal or other disks or closures can be inserted and interlocked with the recesses to form a container comprising a glass body having closures at each end.

Still another object of the invention is to provide a method and apparatus whereby any portion of the cylindrical glass article, open at each end, can be either reduced or increased in diameter internally as desired without affecting the configuration of the external surface.

Still another object of the invention is to provide a novel and improved construction of centrifugal molding apparatus and finishing tool or device cooperating therewith for carrying the method into practical effect.

In accordance with this invention the forming of a hollow cylindrical glass article or body, open at each end, is affected by spinning molten glass in a mold rotating at sufficiently high speed to cause the distribution of the glass along the surfaces of the mold to shape the external surface and ends of the body, in which centrifugal molding action the internal surface of the body under normal conditions should be of uniform diameter or truly cylindrical or substantially so. As stated, however, it may be desirable to accurately control the uniformity of the internal surface with regard to diameter, or to stipple or imprint a design or other matter on the internal surface, or to provide one or both ends of the article with grooves or recesses for the reception of sealing closures, or to reduce or increase the internal diameter of the body at any point, without affecting the configuration of the external surface. This is effected by inserting into the open end of the mold, immediately after the body has been centrifugally formed, a properly shaped tool and causing such tool to act upon the internal surface while such surface is still in a sufficiently plastic condition.

In the accompanying drawings showing for purposes of exemplification certain means for carrying the invention into practical effect, Fig. 1 is a side elevation, with parts in section, of a centrifugal molding apparatus, showing the mold drawn into the holder for an article forming operation.

Fig. 2 is a vertical longitudinal section on an enlarged scale through the mold, mold holder, a formed tubular article and forming or finishing tool arranged within the article for finishing the inner surface of the article, the tool in this instance being provided with die ribs for forming holding grooves in the article.

Fig. 3 is a cross-section on the line 3—3 of Fig. 2.

Fig. 4 is a longitudinal section of the article as it appears at the end of the forming and finishing operation carried out by the devices shown in Figs. 2 and 3.

Fig. 5 is a longitudinal section through a formed article as it may be produced and just before being acted upon by the forming tool, showing a fin on the article which is to be eliminated by the action of the tool.

Fig. 6 is a view similar to Fig. 4 showing a modified form of mold for forming an article with external holding beads and a tool for forming the entire inner face of the article with a frosted surface of checkered or diagonally ribbed character.

Fig. 7 is a view similar to Fig. 6 showing the use of a tool provided with die surfaces for forming spaced checkered, ribbed or other frosting bands upon the inner surface of the article.

Fig. 8 is a sectional view of the article produced by the mold and tool shown in Fig. 7.

Fig. 9 is a view similar to Fig. 6 showing the use of a tool having die surfaces for forming stippled frosting bands upon the inner face of the article.

Fig. 10 is a sectional view of the article produced by the mold and tool shown in Fig. 9.

In carrying my invention into practice I provide a centrifugal molding apparatus, which may conform to either one of the two forms disclosed in my aforesaid applications, or be of any other form and construction suitable for the purpose. The form of apparatus herein shown comprises a closable and openable article forming rotary mold 1 which is adapted to be held in closed position while in operation within a mold holder or shell 2, which is rotatable in a forming operation in unison with the mold. These elements may be mounted for use in a vertical position or in a horizontal position or in any intermediate angular position. The mold and its holder are, however, preferably disposed for use in a horizontal position, as this position obviates the necessity of raising and lowering the mold for article forming and convenient article ejecting actions, and provides for the more ready ejection of the formed articles and their transfer to a lehr for annealing.

The mold 1 comprises a generally cylindrical body divided along a central longitudinal line to form two sections 3 and 4. These sections are interiorly shaped to provide an annular article body forming surface 5. Located at the ends of this surface 5, and respectively at the top and bottom or inner and outer ends of the mold, are inwardly extending flanges 6 and 7 which reduce the diameter of the mold chamber at these points. A head or plate 8 is arranged to bear against the inner end flanges 7 of the mold sections and is provided with an annularly grooved collar 9 the groove of which is formed to receive the inner edges of the flanges 7 of the mold sections. This head or plate and its collar are provided with a threaded opening 10 to receive a threaded stem or shank 11 upon the forward end of a longitudinally slidable and rotatable shaft 12, whereby the mold is adapted to be shifted longitudinally in the holder for mold closing and opening actions. The mold sections are hingedly connected at one side of the mold by hinge pins and link plate connections 13, and the flange 7 of one of the mold sections is fixedly connected, as by means of one or more fastening screws 14, to the head 8, while the other mold section is free from connection with the head, so that when the mold is projected outwardly from its holder the latter-named mold section is adapted to swing to open position.

The mold 1 is fitted in the holder 2 for rotation therewith in an article forming rotation and to slide longitudinally therein for closing and opening actions. To this end the outer surface 15 of the mold is longitudinally tapered and the holder 2 is provided with a chamber 16 to conformably receive the mold, the annular body wall of which chamber has its inner surface 17 correspondingly tapered. The tapered surfaces 15 and 17 act not only as clutch surfaces to connect the mold and holder for rotation in unison, but also as variable binding surfaces to hold the mold from longitudinal movement and keep it closed in any of its seating positions in the holder and adapt the latter to act as a binder or restrainer to prevent spreading of the mold sections under centrifugal force in the rotation of the mold and holder. The chamber 16 is closed at its inner end by a head 18, but is normally open at its outer end to allow inward and outward movements of the mold and said chamber and its tapered surface are of greater length than the mold to adapt the mold to be drawn inwardly to greater or less degrees and to be fully closed by the holder and held by the tapered surfaces in any of its inwardly drawn or seating positions. At its outer end the holder is annularly enlarged or provided with a flaring or bell mouthed portion 19 adapted to accurately guide the mold into the holder and to permit the hinged mold section to swing open as soon as the inner end of the mold is forced outwardly in an article ejecting action beyond the open end of the holder, but not before. By this means the mold is adapted to be seated fully and tightly at all times in the holder regardless of the different degrees of expansion to which the mold and holder are subjected by heat in the molding operations and the mold is also adapted to be closed against any tendency of its sections to spread under centrifugal force.

The mechanism for rotating the mold and holder and sliding the mold into and out of the holder may be of any preferred construction. In the construction shown, however, the holder is mounted at its closed end on a hollow horizontal shaft 20 journaled in suitable bearing supports 21 and carrying a double pulley 22 driven by drive belts 23 from an electric or other suitable motor (not shown) capable of driving the mold and holder at a very high rate of speed. Suitable speed gearing may be used in the driven connection if and when required in order to obtain the desired high speed. Also, any suitable type of brake mechanism may be used to quickly stop the rotation of the mold and holder at the end of each article forming action. As shown, the longitudinally sliding mold shifter rod 12 extends through the hollow shaft 20 and through the head 18 and into the mold holding chamber 16 for connection with the mold in the manner described. This rod is rotatable with the mold, mold holder and shaft 20 in a molding operation and is adapted to be shifted longitudinally in one direction or the other when the mold and holder are at rest to draw the mold into the holder and close it and force it out of the holder and open it. The rear end of the rod has fixed thereto a pair of spaced abutments 24 and 25 and the portion of the rod therebetween passes through an opening 26 in an operating lever 27 pivoted at one end on one side of the rod, as at 28, and having an operating end or arm 29 extending beyond the opposite side of the rod. This lever may be moved rearwardly to transmit movement through the abutment 25 to draw the open mold from ejecting position into the holder and it may be moved forwardly to transmit movement through the abutment 24 to force the enclosed mold outwardly from the holder so that its hinged section may drop down and open the mold for the ready ejection of the formed article. When the parts are in position for a molding operation the rod 12 will rotate freely in the opening 26 and it may, if desired, be held fixed by hand or by suitable fastening means in such position during the molding period.

It is desirable to provide some means to ensure the accurate positioning of the mold for an opening and article discharge action when, at the end of an article forming operation, it is brought to a state of rest and so that its hinged section will be disposed beneath its fixed section and in position to drop downward to open the mold for the discharge or removal of the formed article. To this end a stationary rod turning member or cam 30 having an inclined cam surface is provided to engage the correspondingly inclined surface of a stationary cam member 31 provided upon one of the bearing supports 21. The cam faces of these cams or rod turning members are so arranged that when the lever 27 is moved to shift the rod forwardly for a mold opening action, the cam surfaces of the members will be brought into engagement at the moment of release of the mold from the holder so that if the mold is not disposed with its hinged section lowermost and in position to drop down the rod will be rotated to turn the mold to such position. The cams or rod turning members when so engaged will also provide a lock to hold the mold in its discharge position.

In the operation of the apparatus for the manufacture of a tubular or cylindrical glass article, the mold, if not disposed within its holder, is drawn into the holder by a proper retracting movement of the shifter rod 12, whereby it is clutched to the holder for rotation therewith and held in closed position. The holder and mold are then rotated at very high speed and a charge of glass of a proper amount and temperature is then suitably fed into the mold. While it has been stated that the mold and the holder are rotating when glass is fed into the mold, it will be understood that the glass may be fed into the mold before the mold and the holder are set in motion. The mold and holder are driven at such high speed as to produce a centrifugal force of such a degree as to cause the glass to spread and flow over the forming surfaces 5, 6 and 7, on which it will be properly deposited to form an article of the character described, that is, a tubular or cylindrical body, open at each end and of uniform diameter from end to end thereof, which body is provided with end portions finished by the mold surfaces of the flanges 6 and 7. As set forth in my above designated prior applications, the mold is preferably made of stainless steel and provided with a polished inner forming surface.

In practice the article body forming surface 5 may be shaped to produce an article which is externally of true cylindrical shape or of any other desired external shape and which is formed or not with seal holding beads or projections, letters, figures, monograms, trademarks or other ornamental matter molded integrally therewith, while at the same time, as a result of the centrifugal distributing action of the glass, the inner surface of the article will be of cylindrical form and of generally uniform diameter from end to end thereof. Where an article of truly cylindrical shape, both internally and externally is produced, the article will be of equal or substantially equal wall thickness throughout and provided with substantially smooth finished internal and external surfaces.

The molds 1 and 1a shown respectively in Figs. 1, 2 and 3 and in Figs. 6, 7 and 9 are generally similar in construction, but differ in the respect that the molds 1a are provided at the points of intersection of their surface 5 and flanges 6 and 7 with annular grooves 32 for the purpose of forming annular holding beads on the exterior of the article adjacent its ends, as hereinafter described, while the mold 1 is devoid of such grooves and is designed for producing an article without such holding beads. In each case the article produced is of generally similar form, the article A produced by the mold 1 has an outer surface a of a desired configuration formed by the mold surface 5, an inner surface b of substantially uniform diameter and finished end surfaces c formed by the mold flanges 6 and 7, said article being devoid of external beads, but being provided with internal holding grooves d formed by an auxiliary forming tool, whereas the articles A', A2 and A3 produced by the mold 1a are provided with holding beads d' formed by the mold grooves 32. The grooves d of article A and beads d' of articles A', A2, A3 are adapted to be engaged by heads or sealing disks or closures of any suitable material and type which may be locked in tight sealing engagement therewith to close the ends of the article when it is used as a container for packed commodities. The grooves d in the article A and certain features of the articles A', A2, A3 herein disclosed are formed by means of an article forming tool and as a finishing part of the method of manufacture, as I will now proceed to described.

The mold 1, as stated, is adapted to produce a tube of uniform internal diameter, of a desired external configuration, and having plain finished ends, while the mold 1a is adapted to produce a tubular article of the character described having external annular beads produced at or in the region of the ends thereof by the forming grooves 32. As also stated, it is desirable to provide as a part of the forming method means for removing fins or other undesired surfaces or projections which may be unavoidably formed on the article, or to provide for shaping the internal surface to ensure the production of a tube of truly uniform diameter or of any internal shape, or to stipple or otherwise impress the internal surface to give a frosted or other effect or to provide the tube with internal grooves or external beads or projections for locking and sealing engagement with closure heads. I accordingly provide a method of and means for performing any of these auxiliary operations on the tubular article at a stage immediately following the conclusion of the formation of the article proper in the mold, but before it is ejected therefrom and while the glass at its inner surface at least is sufficiently plastic for the purpose. In Fig. 5 I have shown an article Ax which in the centrifugal forming operation has been formed at an end thereof with an undesired annular fin or bead e which it is desirable to remove.

For the purpose of carrying these auxiliary operations into effect I provide a forming or impressing tool or die comprising an operating or manipulating rod or shaft 33 having at one end a head 34 and carrying a forming or impressing roller 35 rotatably mounted thereon. This roller is provided with a bore or chamber 36 opening through one end of the roller and terminating in a portion 37 of enlarged diameter which receives the head 34, whereby such end of the chamber is closed and the roller held from longitudinal movement in one direction. At its opposite end the roller is provided with an axial passage 37' through which the rod or shaft extends, the roller being thus mounted to turn freely and loosely about the rod or shaft as an axis. The end of the roller provided with the passage 37' is arranged to abut against a retaining collar or sleeve 38 suitably fixed to the rod or shaft, as by a fastening pin 39, whereby the roller is held from longitudinal movement in that direction. Within the chamber 36 and the roller are disposed anti-friction bearings 40 separated from each other and from the head 34 by bushings 41, these bearings adapting the roller to rotate with a minimum of friction about the rod or shaft. This roller constitutes a forming or impression die having a forming surface of any suitable type for the performance of work upon the inner surface of the formed glass cylinder. In the form shown in Figs. 2 and 3 the roller 35 is provided with annular end portions 42 increasing its diameter at these points and which are formed with V-shaped annular forming ribs 43 by means of which the annular receiving grooves d may be formed in the internal surface of the glass cylinder adjacent to the ends thereof, as shown in cylinder A illustrated in Figs. 2, 3 and 4. The end of the shaft carrying the collar 38 may be extended beyond the roller to any desired degree and be formed or provided with a manipulating handle whereby the tool may be introduced into and withdrawn from the mold.

In the operation of employing the tool for treating the internal surface of the cylinder, the tool is introduced into the mold through the outer open end thereof at a time when through centrifugal action the complete article has been formed but before the inner surface thereof has cooled to an appreciable degree and while it is still in a plastic state, and also preferably while the mold is kept rotating at a desired speed. When so introduced the roller will be disposed between the mold flange 6 at one end of the mold and mold flange 7 and collar 9 at the other end of the mold and arranged to bear against the inner surface of the cylinder. When the tool is brought and suitably held in engagement with the internal surface of the article as the mold rotates, the roller 35 will also be rotated and its ribs 43 will form in the internal surface of the article grooves d of suitable depth. After the grooves are formed the tool is removed from the mold, the mold brought to a stop, and the formed article discharged by shifting the mold out of its holder so as to allow the hinged mold section to drop open. In the event that the article so treated is provided with a fin e or like excrescence which is to be removed the tool will iron out the fin or excrescence. It will be observed that the ends of the tool roller bear snugly against the flanges 6 and 7 of the mold and prevent any exudation of glass at these points, the displaced glass being spread over and retained in the body wall of the article.

The impression die or roller or its surface may be of a form or configuration to iron out any imperfections or unevenness in the internal surface of the article to produce an article of mathematically true internal diameter, or to give the article any desired internal form, or to provide the internal surface b, throughout the whole or over any portion of its extent, with imprinted matter or impressions of any desired form and arrangement of design or other appearance or effect. In Fig. 6 I have shown the die roller provided with a surface 45 for impressing the surface b of article A' with a ribbing of crossed diagonal ribs f such as to give an ornamental appearance and frosted effect. In Fig. 7 I have shown the die roller provided adjacent each end with checkered band surfaces 46 for impressing similar bands g upon the surface b of article A2, as shown in Fig. 8. In Fig. 9 I have shown the die roller provided with bands of nubs or similar projections 47 to impress the surface b of article A3 with stippled band surfaces h. The surfaces g and h not only produce an ornamental appearance but give a frosted effect and may be designed to render the container body as translucent or opaque as desired at and in the region of its ends. This will be found desirable in packing certain commodities which contain portions of different specific gravities or solids liable to settle at the bottom of the container and give an unattractive appearance to an otherwise attractive article. By the provision of such ornamental concealing bands on the container this objection will be overcome regardless of which end of the container is disposed uppermost. In practice, however, these ornamenting and container bands may vary in number and be used at any point along the container. In place of the bands any wording, designs, trademarks or other matter may be impressed upon the container to give the name of a product, its manufacturer, the trademark of the manufacturer, or strictly ornamental matter which may serve to partially conceal the contents if so desired. It is obvious, of course, that the character of the work performed by the auxiliary tool may be to give utility only, ornamentality, or both. As stated, the auxiliary tool may be suitably shaped to impart any desired internal form to the article or cross-sectional shape thereto alone or in addition to that conferred by the mold surface 5. I, therefore, do not limit the invention in this respect. As this work is done after the article body is formed but while its internal surface is still plastic and the mold still rotating, accuracy and speed of operation is obtained and the necessity of reheating the article avoided. While rotation of the tool roller is effected in carrying on the operation as above described, in which the roller is rotated by contact with the rotating article, it may be possible under some conditions to secure the same result by power driving the tool about the interior of the article while the article is at rest.

It will, of course, be understood that while the construction of the instrumentalities herein disclosed for carrying the method into practical effect is preferred, changes in the form, construction and arrangement of the parts, additionally to those specified, may be made within the scope of the appended claims, without departing from the spirit or sacrificing any of the advantages of the invention.

What I claim is:

1. In a centrifugal apparatus for forming a hollow glass article of a predetermined length and wall thickness and open at each end and having finished rim ends, a rotary centrifugal mold mounted on a substantially horizontal axis and provided with a forming chamber to receive a charge of glass, said chamber being open at one end and having an annular article body forming surface extending about the mold axis and of a length conforming with the length of the article to be formed, and article end forming surfaces projecting inwardly at the ends of the article body forming surface radially to the mold axis to an extent greater than the wall thickness of the article to be formed, means for rotating the mold at high speed about its horizontal axis to cause the flow of glass by centrifugal force alone against said forming surfaces to form a hollow glass body open at each end and having finished rim ends and which is of less wall thickness than the radial extent of the article end forming surfaces, whereby at the end of the centrifugal forming action portions of the article end forming surfaces lying on the inner side of the hollow body will be left free and clear of deposited glass, and a rotary finishing tool adapted to be introduced into the mold through the open end thereof for cooperation with said surfaces to modify the centrifugally formed body and give a desired finished form thereto, said tool comprising a rod or shaft and a pressing roller rotatably mounted thereon and provided with a peripheral compression surface to press the body against the forming surfaces, said shaft and roller being movable laterally toward the formed body and said roller being rotatable in contact with the inner surface of the body about the rod or shaft as the mold and body are rotated and having end portions arranged in parallel relation to the article end forming surfaces to slidably and rotatably engage said glass clear portions thereof to guide the tool in its lateral and rotational movements and to maintain said roller in said movements parallel with the mold axis and the internal surface of the hollow body.

2. The method of forming and internally finishing or shaping an open ended tubular glass article having finished end surfaces which consists of feeding to a substantially horizontally disposed substantially stationary mold having internal article body and end forming surfaces a molten glass charge of a volume equal to that of the completed article, depositing the charge on the internal article body forming surface of the mold, rapidly accelerating rotation of the mold about a substantially horizontal axis to cause by centrifugal force alone the flow of glass along its internal forming surfaces to form a tubular open ended body with finished ends, inserting a spinning tool having a desired impressing surface into the formed body while the internal surface of the body is still in a plastic state, and then rotating the tool about the internal surface of the article and in contact therewith to impress said surface.

3. The method of forming and internally finishing or shaping a tubular open ended glass article which consists in feeding a charge of molten glass into a substantially horizontally disposed mold having internal annular article body and article end forming surfaces, depositing the glass charge onto the article body forming surface of the horizontally disposed mold, rotating the mold about a substantially horizontal axis to cause by centrifugal force alone the flow of glass along the forming surfaces to form a tubular open ended body with finished ends, inserting a spinning tool having a desired impression surface into the formed body while the internal surface of the body is still in a plastic state and so as to lie between and with its end surfaces in contact with the article end forming surfaces of the mold, and then relatively rotating the mold and tool about parallel axes so as to impress the internal surface of the article while guiding the tool to maintain its axis parallel with the mold axis and to keep its end surfaces in contact with the article end forming surfaces of the mold to close the mold adjacent the ends of the article against endwise flow of glass and elongation of the formed article.

4. The method of forming a tubular open ended glass article of a predetermined length and wall thickness and desired form or configuration and having finished rim ends comprising feeding a charge of molten glass into the substantially horizontal rotary mold having an internal annular article body forming surface extending about the mold axis and of a length conforming with the length of the article to be formed and internal article end forming surfaces at the ends of the article body forming surface projecting inward radially to the mold axis to an extent greater than the wall thickness of the article to be formed, depositing the charge on the article body forming surfaces of the horizontally disposed mold, rotating the mold at high speed about a substantially horizontal axis to cause by centrifugal force alone the flow of glass along said forming surfaces to form a tubular open ended glass body having finished rim ends and which is of less wall thickness than the radial extent of the article end forming surfaces, whereby at the end of the centrifugal forming action portions of the article end forming surfaces lying on the inner side of the hollow body will be left free and clear of deposited glass, introducing a rotary compressing roller into the mold, continuing the rotation of the mold, and moving said roller laterally toward the formed body and rotating it in contact therewith while the mold and body are rotating and guiding the roller by slidable and rotational engagement of its ends with the glass clear portions of the article end forming surfaces to maintain said roller in said movements parallel with the mold axis and the internal surface of the hollow body.

5. In an apparatus for forming and internally finishing hollow glass bodies, a substantially horizontal centrifugal mold having a forming chamber provided with an annular article body forming surface and article end forming and finishing surfaces, said chamber having an open end for the feeding of a charge of molten glass to the mold and its deposit on said annular article body forming surface, means for rotating the mold at high speed about a substantially horizontal axis to cause by centrifugal force alone the flow of glass onto the forming surfaces to form a tubular open ended glass body, and a rotary finishing tool adapted to be inserted into the glass body and to be rotated about an axis parallel with the mold axis during rotation of the mold about its axis and in contact with the internal surface of the glass body to impress the same while still in a plastic state, said tool comprising a supporting rod or shaft, and an impression roller revolubly mounted on said rod or shaft and of a length to fit between the article end forming surfaces of the mold and having end portions adapted to engage said article end forming surfaces of the mold to close same adjacent the ends of the article and having a forming surface therebetween for impressing the internal surface of the article.

6. The method of forming and internally finishing an open ended tubular glass body with finished ends, which consists of feeding a charge of molten glass into a substantially horizontally disposed mold open at one end and having an internal annular article body forming surface and internal flanges about the ends of said surface, depositing the charge at some intermediate point on the annular article body forming surface rotating the mold about a substantially horizontal axis to cause by centrifugal force alone the flow of glass along and about the annular body forming surfaces and flanges to form a tubular open ended glass body with its ends abutting the flanges of the mold, then inserting into the mold through the open end thereof, while the glass body is still in a plastic state, a roller of a length adapting it to fit snugly between said flanges of the mold and turn in contact therewith and rotating and pressing the roller against the inner face of the annular wall of the body to remove irregularities formed during spinning of the glass and impart a predetermined configuration to the inner surface of the glass body.

PAUL R. LUERTZING.